United States Patent
Seol et al.

(10) Patent No.: US 9,106,318 B1
(45) Date of Patent: Aug. 11, 2015

(54) METHOD OF TRANSMITTING AND RECEIVING DATA USING DATA PLUS FORMULA IN POWER LINE

(71) Applicants: In Kwon Seol, Yongin (KR); Byirng Hwa Shirl, Seongnam (KR); Kwang Jae Lee, Cheonan (KR)

(72) Inventors: In Kwon Seol, Yongin (KR); Byirng Hwa Shirl, Seongnam (KR)

(*) Notice: Subject to any disclaimer, the term of this patent is extended or adjusted under 35 U.S.C. 154(b) by 0 days.

(21) Appl. No.: 14/451,554

(22) Filed: Aug. 5, 2014

(30) Foreign Application Priority Data

Aug. 7, 2013 (KR) ........................ 10-2013-0093471

(51) Int. Cl.
*H04B 3/00* (2006.01)
*H04L 25/00* (2006.01)
*H04B 3/54* (2006.01)
*H04B 5/00* (2006.01)

(52) U.S. Cl.
CPC ................. *H04B 3/544* (2013.01); *H04B 3/542* (2013.01); *H04B 5/0093* (2013.01)

(58) Field of Classification Search
CPC .......... H04B 3/544; H04B 3/54; H04B 3/542; H04B 3/548; H04B 3/56; H04B 5/00; H04B 5/0012; H04B 5/0018; H04B 5/0075; H04B 5/0087; H04B 5/0093

USPC ......... 375/258, 257, 219, 220, 222; 455/41.2, 455/402, 41.1; 340/854.9, 854.8, 855.1, 340/12.32, 13.23

See application file for complete search history.

(56) References Cited

U.S. PATENT DOCUMENTS

| | | | | |
|---|---|---|---|---|
| 4,311,964 | A * | 1/1982 | Boykin | 329/306 |
| 6,101,214 | A * | 8/2000 | Hershey et al. | 375/130 |
| 6,549,120 | B1 * | 4/2003 | de Buda | 370/482 |
| 6,671,311 | B1 * | 12/2003 | Raphaeli et al. | 375/142 |
| 2003/0224728 | A1 * | 12/2003 | Heinonen et al. | 455/41.2 |
| 2005/0017849 | A1 * | 1/2005 | Flen et al. | 340/310.01 |
| 2005/0063422 | A1 * | 3/2005 | Lazar et al. | 370/532 |
| 2011/0026621 | A1 * | 2/2011 | Kim et al. | 375/260 |
| 2014/0077966 | A1 * | 3/2014 | Robertson et al. | 340/854.9 |

* cited by examiner

*Primary Examiner* — Phuong Phu
(74) *Attorney, Agent, or Firm* — Patent Office of Dr. Chung Park

(57) ABSTRACT

The present invention provides a technology for remote control of a power supply and construction of a power line communication infrastructure. The data transmission principle is based on an idea in which only a boosting part is configured in an electronic type using a 1 V boosting principle in a process of obtaining secondary 100 V and a data power supply and a power line supply are matched to utilize as on/off digital data. A power line coil at the side of a transformer and a coil at the side of a consumer home form a pair, allowing the coil at the side of the consumer home to receive the flux change of data at the side of the transformer and allowing the coil at the side of the transformer to receive the flux change of data at the side of the consumer home to implement a two-way communication.

1 Claim, 14 Drawing Sheets

| conductor | | | insulation thickness (mm) | insulation outer diameter (mm) | neutral line | | | | sheathing thickness (mm) | outer diameter of finished goods (mm) | conductor resistance (Ω/km) | insulation resistance (mΩ·km) | capacit outer (μF/km) | reference | |
|---|---|---|---|---|---|---|---|---|---|---|---|---|---|---|---|
| nominal cross-sectional area (mm²) | shape | outer diameter (mm) | | | diameter of wire | number of wire | cross-sectional area (mm²) | outer diameter (mm) | | | | | | weight (kg/km) | standard length (m) |
| *38 | | 7.3 | 6.6 | 22.4 | 1.0 | 17 | 13 | 27 | 3.0 | 33 | 0.481 | 4000 | 0.19 | 1350 | 300 |
| 60 | | 9.3 | 6.6 | 24.5 | 1.2 | 18 | 20 | 30 | 3.0 | 36 | 0.305 | 3000 | 0.21 | 1700 | 200 |

FIG. 11

METHOD OF TRANSMITTING AND RECEIVING DATA USING DATA PLUS FORMULA IN POWER LINE

CROSS-REFERENCE TO RELATED APPLICATIONS

This U.S. non-provisional patent application claims priority under 35 U.S.C. §119 of Korean Patent Application No. 10-2013-0093471, filed on Aug. 7, 2013, the entire contents of which are hereby incorporated by reference.

BACKGROUND OF THE INVENTION

The present invention disclosed herein relates to a method of transmitting and receiving data using a Data Plus (DP) formula in a power line.

Generally, power line communication technology can be classified into a contact-type in which high frequency is transmitted to a power line through a power outlet and a noncontact-type using a Current Transformer (CT) concept. The present invention is similar to the noncontact-type in that a typical CT concept is used.

Power Line Communication (PLC) using a typical noncontact-type coupler (see FIG. 13) has a limitation in that when the data frequency is low, a plus (+) portion or a minus (−) portion of data 502a is reduced according to the power phase, making it difficult to commercialize the power line communication. On the contrary, when the data frequency is high, there is a limitation in long-distance transmission and power consumption because a power line 1301 penetrates CT when valid signal data necessary for data reception is added to the power line. Accordingly, applications of power line communication are limited to a ship, and are difficult to distribute to customers Most PLC methods transmit and receive data by contacting a power line through a power outlet using a high frequency. Since 1920s, many studies on the PLC have been conducted by national research institutes and enterprises.

There are many media reports that research institutes and companies succeeded in commercializing PLC, but the truth is disappointing. PLC modems for the network in a building are being commercialized and released, but the clear criteria of success is that the probability of data transmission/reception success from transformers to consumers only through a power line needs to be more than 99% when 1,000 consumer's homes are randomly sampled from 19 million consumer homes in Korea. Currently, PLC technology is determined to be less than 50% and impossible to commercialize on the basis of the above-mentioned criteria and data from the Korea Electrotechnology Research Institute (KERI) and PLC-related enterprises. The estimate of the present applicant is less than 23%.

SUMMARY OF THE INVENTION

The main reason why typical PLC technology (power outlet contact-type) cannot be commercialized is that matching between a high frequency of transmission data and a power line voltage is difficult only with a power line. A high frequency data signal transmitted to the power line through the power outlet cannot be matched due to the following reasons. Regarding this, a reference document (fabrication of power line communication from http://blog.naver.com/3ear4) will be cited.

Spaces except the power line may be considered to be earth-field. Most of high frequency data signals may be lost through aerial-radiation, and thus the data signals are distorted and attenuated before reaching a destination. This phenomenon is significantly shown in an underground power line in which the humidity is high and the earth-field phenomenon is significant in a closed space, showing much more distortion of signals. The test of Korea Electrotechnology Research Institute (KERI) conducted in 2011 shows that the transmission rate is significantly lower (equal to or less than about 10%) in underground power line than in ground power line.

The present invention provides a method of transmitting and receiving data using Data Plus (DP) formula in a power line, which can provide a commercializable power line communication environment by supplying (transmitting or outputting) power at the same capacity as the voltage of the power line through matching of a voltage of a data signal source with the voltage of the power line and the induced current and thus receiving the data signal as the induced current through a well-know method or a typical PLC method.

In the data transmission principle of the present invention, a 1 V boosting part in a process of obtaining secondary 100 V may be configured in an electronic type in FIG. 9, and a data power supply and a power line supply may be matched to be used as on/off digital data.

The lower drawings of FIG. 9 show that a 1 V boosting process is implemented with 10 V based on the dotted line, which may be utilized as digital data by performing turning on/off using a 10 V tap.

In a process of performing data transmission/reception of a power line, transmission data in coils (101, 103, 201, 301, and 303) wound n times may be transmitted as an induced current of the flux change (H), and the transmitted data current may be received as an induced current of the flux change at reception coils (104, 102, 202, 304, and 302) to achieve two-way data communication.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 11 is a view illustrating a data sheet of electrostatic capacity of a line;

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

Existing terms, criteria of explanation, and new terms will be defined as follows to describe the present invention.

The term Data Plus (DP) is a new-coined word that utilizes a Current transformer (CT) for the data transmission/reception using an inverse concept of a typical CT principle by adding a data frequency voltage to a power line voltage.

The term Data Plus Transformer (DPT) 408 is defined as a transformer that serves to add a data voltage to a power line voltage by transmitting data to a primary coil 407 and delivering data to a secondary power line coil 409 through a magnetic core.

The term earth-field is a new-coined word that considers a conductor radiating a high frequency as one point on space and considers three-dimensional space except that point as a high frequency radiated space.

An amplifier of zero in signal-to-noise ratio (SNR), which can amplify a signal even when a signal source converges on zero, does not exist in reality.

Power transmission and distribution facilities of each country differ in single-phase two wire system, single-phase three wire system, three-phase three wire system, three-phase four wire system, high voltage and consumer voltage, and frequency, but the basic theory and principle of the present invention will be provided so as to be applicable to any power transmission and distribution facilities based on the following criteria.

A transformer illustrated herein is a high voltage transformer constructed on a power poled or under the ground, and will be illustrated as a single-phase two wire system having a capacity of about 100 kVA, a frequency of about 60 Hz, and a primary voltage of about 22,900 V, and a secondary voltage of about 220V.

Unless otherwise specifically stated, the protocol of high frequency or data and transmission/reception signal will be indicated as a standard FSK method (center frequency (f=400 kHz, 100 mV), i.e., f=±Δf, frequency $f_1(f+\Delta f)$ is data 1, and frequency $f_0(f-\Delta f)$ is data 0).

Figure 4A:
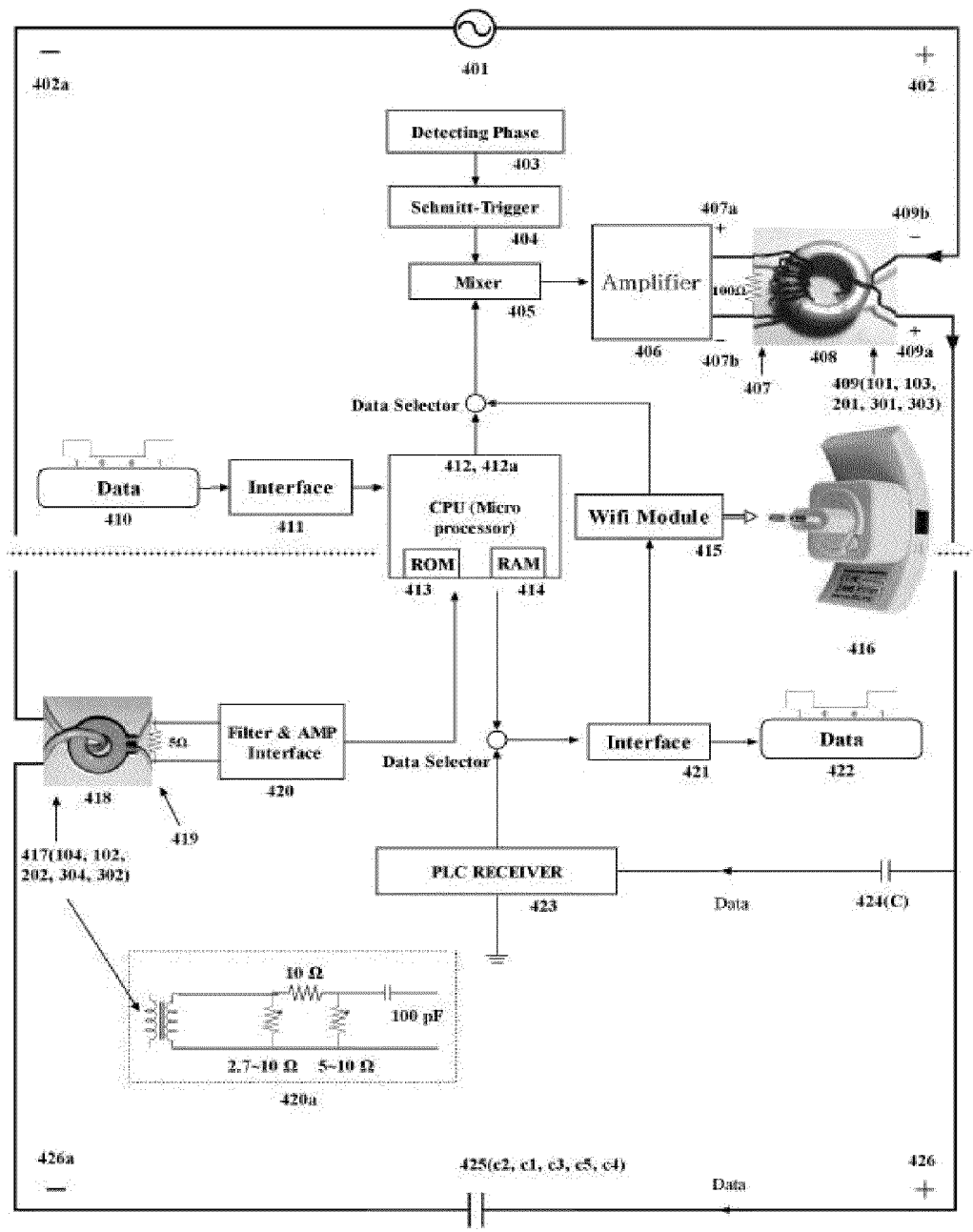
FIG. 4A is a block diagram illustrating circumstances in which the present invention can be implemented.

In FIG. 4A, the value of the open circuit voltage of a coil 407 and the value of the data receiving voltage of a coil 419 may be calculated using proportional values obtained by quoting R100 and R5 parts among the data sheet 10 of the current transformer (TS76V/L) from Taehwatrans Inc. (www.taehwatrans.com), respectively.

For the electrostatic capacity, data (0.18 F/km) of the nominal cross-sectional area 38 (mm2) among the data sheet of FIG. 11 from Daesin Electrics Co. (www.e-dsec.co.kr) may be applied.

The formation frequency of a power line coil will be described based on one time.

n, N are integers (1, 2, 3, . . . ), and n denotes the number of windings (one time, two times, three times, . . . ).

Figure 4B:
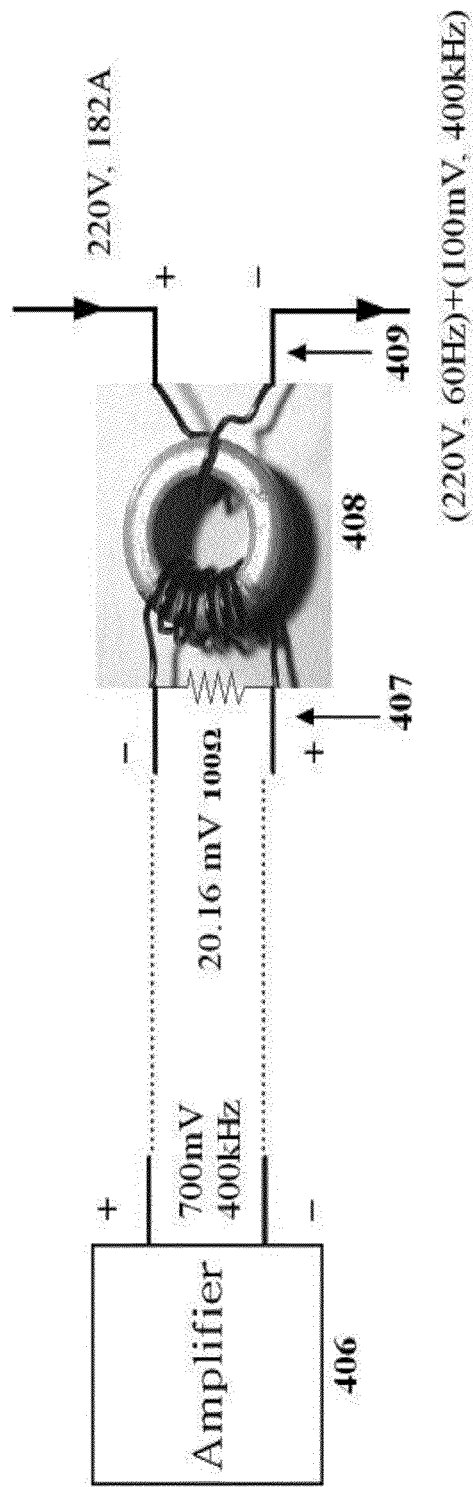
FIG. 4B is a view illustrating DPT data transmission.

CPU 412 and 412a of FIG. 4 denote a transmitter CPU 412 and a receiver CPU 412a. ROM and RAM of the receiver CPU 412a may be separately called as a receiver ROM and a receiver RAM.

In FIG. 4, the coil 409 sequentially denotes coils 101, 103, 201, 301 and 303. The coil 417 denotes coils 104, 102, 202, 304 and 302 in the same order, and a condenser 425 sequentially denotes condensers c2, c1, c3, c5 and c4. The transmission/reception means transmission/reception by each group of the coils and condensers (101, 104, c2), (103, 102, c1), (201, 202, c3), (301, 304, c5), and (303, 302, c4).

Figure 1:
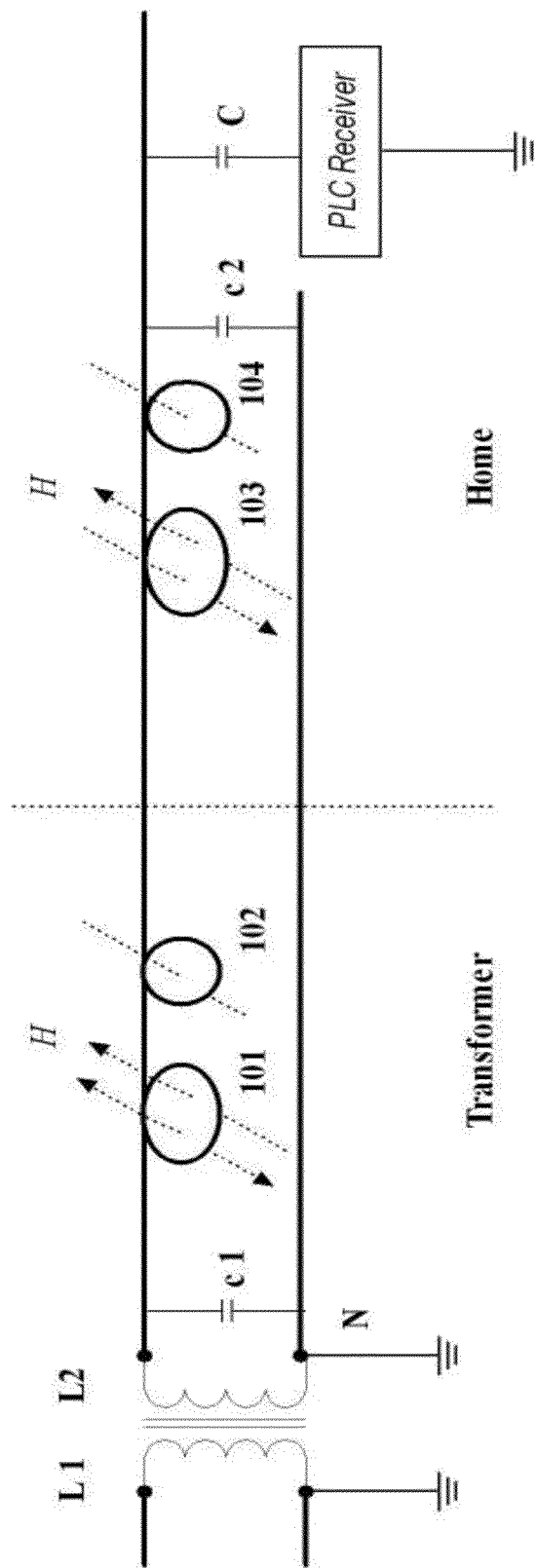
FIG. 1 is a power distribution view illustrating data transmission/reception of a lower voltage consumer home according to embodiments of the present invention.
Figure 2:
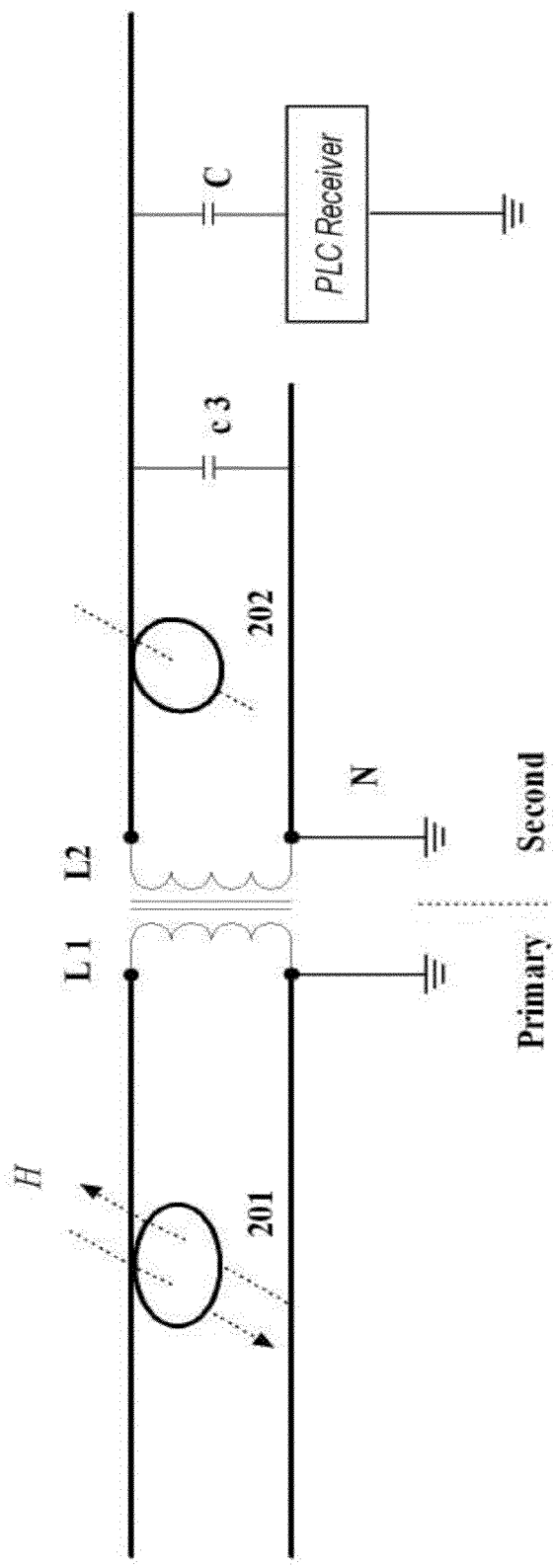
FIG. 2 is a power distribution view illustrating data transmission/reception of a transformer according to embodiments of the present invention.
Figure 3:
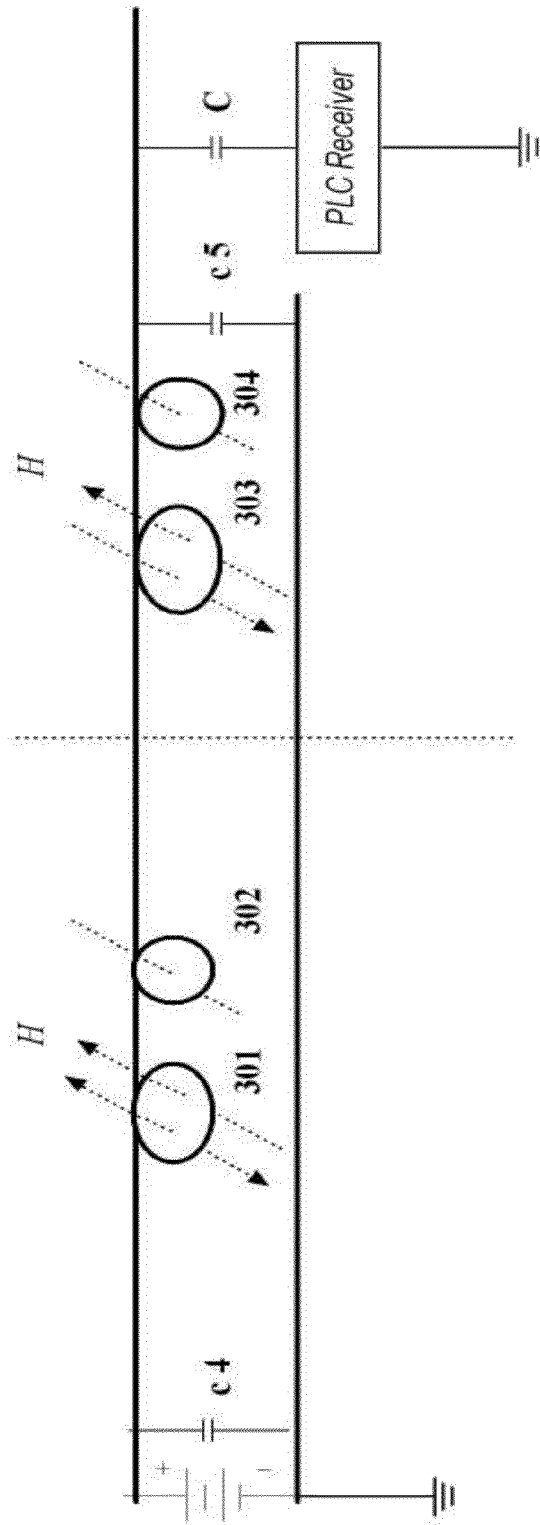
FIG. 3 is a power distribution view illustrating data transmission/reception of a DC power source according to embodiments of the present invention.

FIGS. 1, 2, and 3 are views illustrating the basic principles of data transmission/reception of power distribution of a low-voltage consumer home, power distribution between a high voltage and a low voltage across a transformer, power distribution of DC. When summarizing the process of data transmission/reception of a power line, transmission data in the coils 101, 103, 201, 301, 303 of the power line may be transmitted as an induced current of flux change H, and the transmitted data current may be received as an induced current of flux change from the reception coils 104, 102, 202, 304, 302.

In order to add the data voltage to the power line voltage, the flux occurrence direction of the data current needs to be the same as the flux direction formed by the power line coil 409 according to the phase of the power line. The power line power may be an infinite power whose internal resistance converges on zero. When the flux occurs in the opposite direction to the flux direction of the power line current, the power line voltage and the data voltage may be short-circuited. Accordingly, the flux direction of the data current is allowed to be the same as the flux direction of the power line current.

FIG. 1 shows a power distribution system of a general consumer home, the data transmission/reception of which shows the following features.

(1) The two-way communication may be implemented such that flux change H of the coil 101 is received by the coil 104 and the flux change H of the coil 103 is received by the coil 102.

(2) The condenser c1 and c2 may be for the data current.

Figure 6:
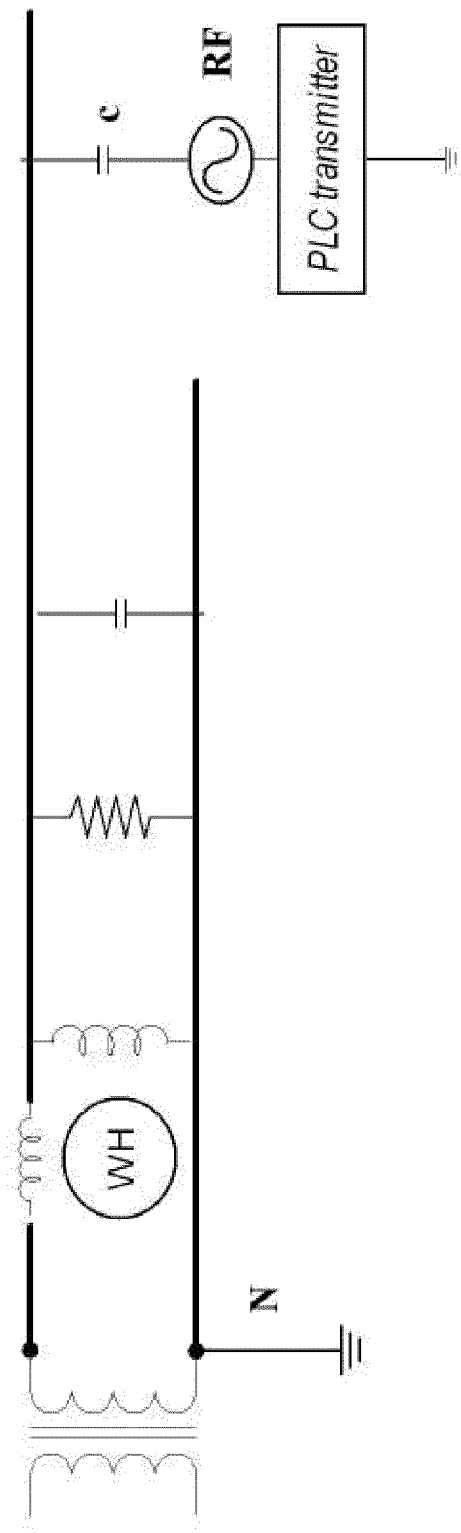
FIG. 6 is circuit diagram illustrating conventional PLC circuit.

In FIG. 6, regarding the load of the consumer home, several tens or hundreds of resistors R, coils L, and condensers may be connected in parallel. Regarding the flow of the data current, when the whole of the consumer home load is considered to be one resistor, even without the condensers c1 and c2, the data current may flow through the consumer home load and the transformer. However, since the load itself varies from moment to moment, the condensers c1 and c2 may be necessary for the stabler data reception. When data is received through an indoor power outlet, the data current may be allowed to flow through the condensers c2 and 425 because there is no data current flow in no load state. In this respect, the condenser can be called a dummy load.

(3) When a communication infrastructure is constructed to a transformer, an Internet network can be built from the transformer to the consumer home through the power line. In advanced countries, since the communication infrastructure is constructed on every power pole, WiFi network can be constructed by unit of the power outlet of the consumer home.

Sure, a specific frequency data current flow may also be further smoothened by a c1, L2 parallel resonance circuit.

When the data transmission rate of only the power line is the same as a coaxial cable and the transmission distance is the same, a typical cable modem router adapter coaxial cable LAN line can be replaced with one indoor WiFi router 416.

FIG. 2 shows a power distribution system between a high voltage and a lower voltage across a transformer, the data transmission of which shows the following features.

(1) One-way communication may be implemented by allowing the coil 202 at the side of the consumer home to receive the flux change H of the coil 201 at the side of the transformer. Since the consumer home load at the secondary side always changes, the detection of the flux change may be impossible because the flux change of the secondary side L2 can be sensed at the primary side L1. The voltage variation at the primary side may theoretically exist, but currently, there is no ideal amplifier that is zero in signal-to-noise ratio (SNR) and can detect this extremely slight voltage.

(2) In order to allow a data current generated in the coil 201 to flow only in the primary coil L1 of the transformer, a condenser for the data current may not be used.

(3) This can be applied to remote control from a power station or a substation to a consumer home, control of streetlights, and traffic lights, and may be used for text or general broadcasting. Also, two-way communication can be implemented using the two-way communication principle of the consumer home as shown in FIG. 1. In order to achieve the two-way communication from a high voltage part to a consumer home, a relay device may be added to a transformer part. However, in the advanced countries, since a communication infrastructure already exists, the two-way construction of the high voltage part may become overlapping investment, requiring consideration of economic advantages.

FIG. 3 shows the basic principle of data transmission/reception in the DC power distribution, which shows the following features.

(1) Two-way communication may be implemented such that the flux change H of the coil 301 is received by the coil 304 and the flux change H of the coil 303 is received by the coil 302.

(2) The condensers c4 and c5 may be for the data current.

(3) Since the data transmission is possible only by the power line in airplanes (400 Hz) and ships (60 Hz) of DC power distribution system, the power distribution may become simple and lightweight.

Hereinafter, a data transmission method that can be implemented by those skilled in the art will be described.

Figure 7:
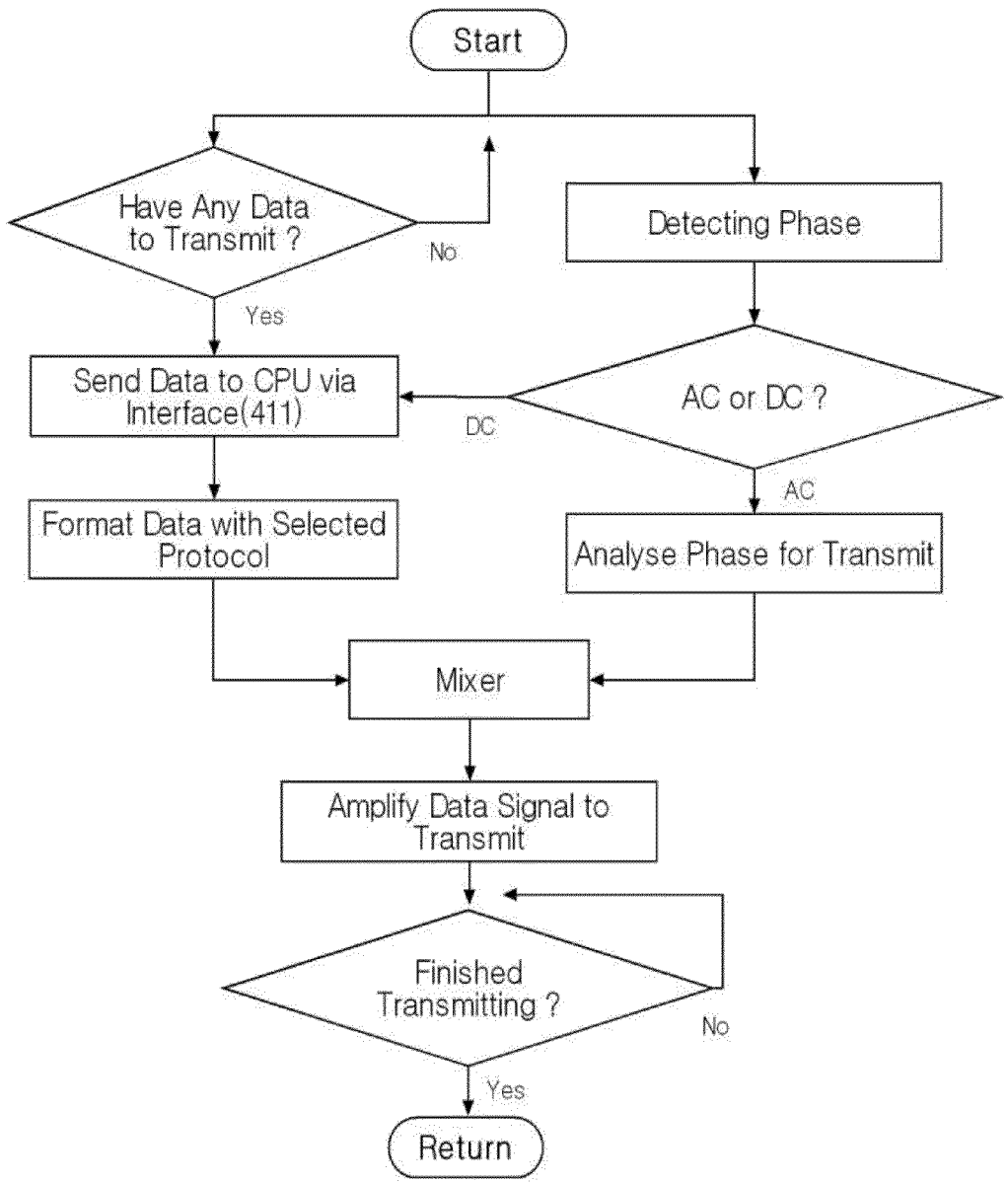
FIG. 7 is a flowchart illustrating according to an embodiment of the present invention.

FIG. 4 shows a data transmission/reception process based on a case where power is positive phase 402 and 402a. In FIG. 4, based on the dotted line at the middle portion of the drawing, the upper side is a circuit diagram of a transmitter, and the lower side is a circuit diagram of a receiver. Assuming that the transmitter is located at the side of a transformer and the receiver is located at the side of a consumer home, a digital signal 410, data, and 1001 may be transmitted to a transmitter CPU 412 through an interface 411. Data may be converted into a selected protocol by a protocol (FSK, ASK, PSK, and SSB) conversion program of ROM 413 and a transmission program (see FIG. 7) that are embedded in the CPU 412, and then may be transmitted to a mixer 405.

The phase of the voltage may be detected from a power supply 401 to determine whether power is DC or AC. When power is determined to be AC, a Schmitt-trigger circuit 404 may send the data transmission time t1~t2 and t4~t5 and a signal of a phase inversion time t4t5 of data 503 among data 502 and 503 divided from original data 501 to the mixer 405. When power is determined to be DC, the phase of which is fixed, the signal processing may be performed similarly to the signal processing method of (+) phase. Here, the phase inversion of the data 503 may mean that data 503a of a positive voltage is converted into data 503b of a negative voltage.

The transmitted two signals may be phase-inverted by the mixer 405 according to the transmission time, and then may be transmitted to a data amplifier 406 to be amplified. Thereafter, the signals may be transmitted to a coil 407, and then may be transmitted to a coil 409 as an induced current by a DPT 408.

Figure 5:
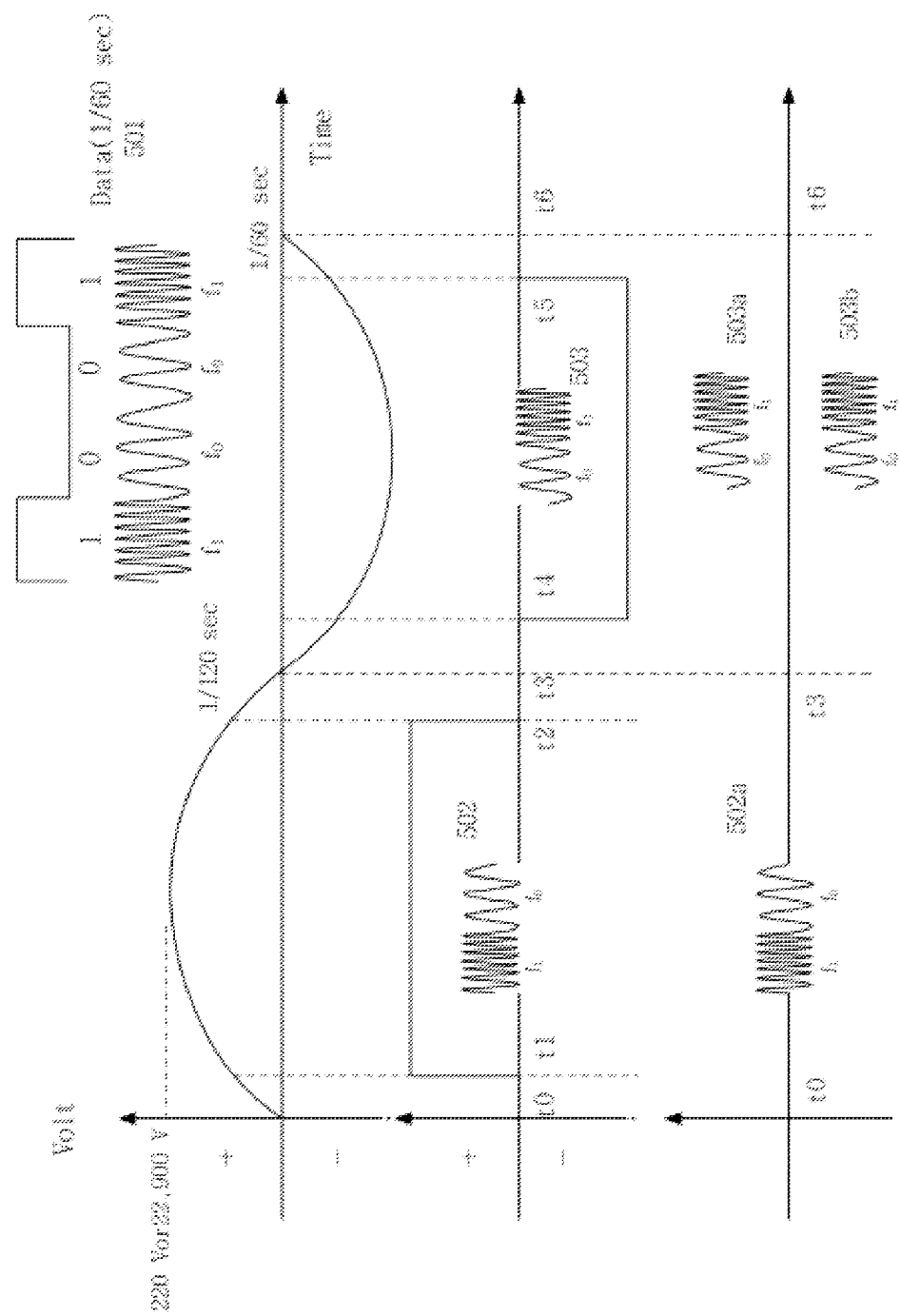
FIG. 5 is a circuit graph according to an embodiment of the present invention.

For example, regarding the transmission process of FSK signal data 501 of FIG. 5, in order to add the data voltage and the power line voltage, since the flux direction H formed by the power line coil 409 of n windings and the flux direction of the coil 407 in which the data current flows are equal to each other at the positive voltage section t0~t3 among the AC phase of the power line power, the data 502 of a positive voltage needs to be transmitted at the section t1~t2, and the data 503 of a negative voltage needs to be transmitted at the negative voltage section t4~t5 among the AC phase. In this case, in order to maximize the transmission rate, the section t1~t2 and the section t4~t5 needs to be secured to the maximum such that a jitter (skew phenomenon) does not occur at points t0, t3 and t6 at which the voltage phase is changed.

Figure 10:
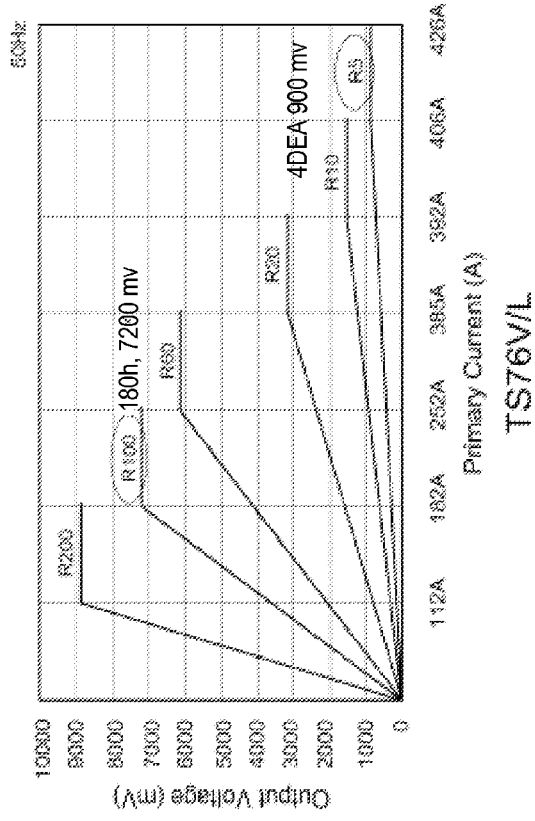
FIG. 10 is a view illustrating a data sheet of a current transformer (TS76V/L)

In FIG. 4A, the secondary current at the side of the transformer may be relatively larger than the current at the side of the consumer home. Assuming that when power is at the positive phase 402, 402a and section t0~t3, a current of about 182 A flows in the coil 409 (number of windings is 1) of the power line at the secondary side, when a resistor 100 is connected in parallel to the coil 407 and opened, the output voltage may become (7200÷2500)×7=20.16 (mV) that is detected at the coil 407 when the data sheet (part R100, burden Resistor 100, 182 A, 7200 mV) of the current transformer (TS76V/L) of FIG. 10 is quoted.

The power consumption by the opening of the coil 407 may become $(0.02016)^2 \div 100 = 0.004064$ mW. Thus, there is no risk (dielectric breakdown and explosion) that may occurs in a very high voltage or high voltage power transmission/distribution facilities according to the opening of the secondary coil based on a typical current transformer (CT) concept. When the data amplifier 406 that outputs a sine wave of data (about 700 mV and about 400 kHz) is connected to the coil 407, the voltage outputted from the coil 409 may be two types, i.e., power of about 220 V and about 60 Hz and data of about 100 mV and about 400 kHz. The current flowing in the resistor 100 of the coil 407 may be 0.7(V)÷100(Ω)=0.007 (A). When the inductance of the coil 407 is about 10 H, the reactance and the flowing current may be about 27.9 mA as shown in Equation (1) below.

$$X_L = 2\pi fL = 2\pi \times 400 \times 10^3 \times 10 \times 10^{-6} \approx 25.133 \Omega \quad (1)$$

$$\frac{V}{X_L} = \frac{0.7}{25.133} \approx 0.0279 A$$

$$X_c = \frac{1}{2\pi fc} = \frac{1}{2\pi \times 400 \times 10^3 \times 0.01 \times 10^{-6}} \approx 39.7887 \quad (2)$$

$$\frac{V}{X_c} = \frac{0.1}{39.7887} \approx 0.00251 A$$

$I=2\pi fc$ Signal$(I)=2\pi(400\times10^3)c$ Noise$(I)=2\pi(60)c$ (3)

In FIG. 4A, when power is about 220 V and about 60 Hz and the current is about 182 A, the load may be calculated to be 220(V)÷182 (A)≈1.209(Ω) when considered to be a pure resistance. The current flowing through the load of the line resistance (1.209) may be 0.1(V)÷1.209(Ω)≈0.083 (A)≈83 (mA). When the condenser 425 is about 0.01 F, the flowing current may be calculated to be about 2.51 mA from Equation (2) above.

Figure 9:
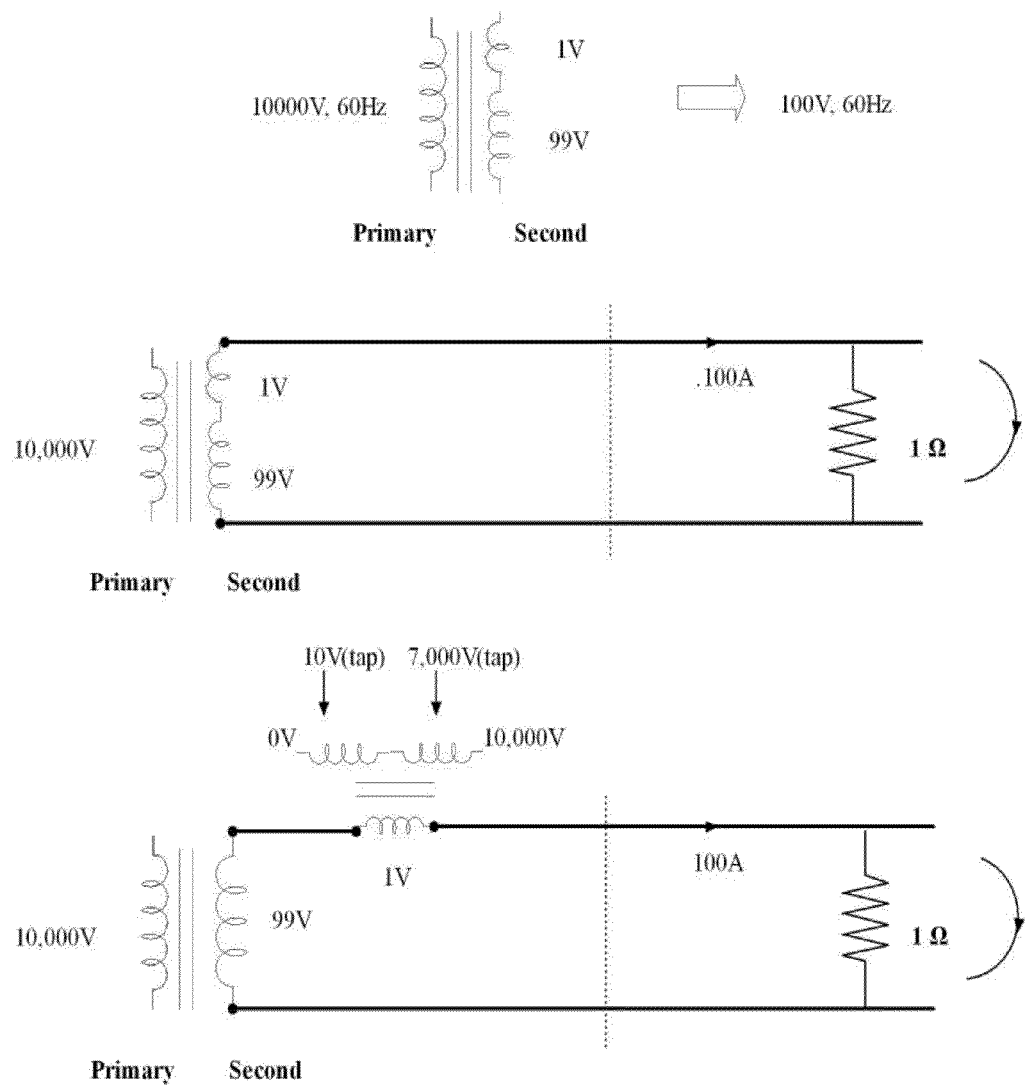
FIG. 9 is a circuit diagram according to an embodiment of the present invention.

The data amplifier 406 and the DPT 408 are the core of the present invention in which the boosting part (1V) of FIG. 9 is configured as a completely electronic type. The voltage polarities 407a, 407b, 409a and 409b of the coils 407 and 409 of the DPT 408 result from the actual tests.

When the coil 409 is wound n times with the power line, a smaller number of windings may allow the construction to be simpler. In order to increase the data output, the output of the data amplifier 406 may be increased, and N coils 407 may be connected in parallel for the transmission. When the internal impedance of the coil 407 is Z and N coils are connected in parallel, the internal impedance Z may become 1/N, and thus the output may become N times.

Hereinafter, a well-known data receiving method will be described as follows.

The transmitted data voltages 409a and 409b may be added to the power line voltage to be distributed into voltages 426 and 426a. The data voltage may be received through the condenser 424, and the data current may flow through the condenser 425. The data current may be received at the coil 417, and then may be received by a filter and amplification interface 420a and 420 via the magnetic substance of the reception coil 418 and the coil 419.

Figure 8:
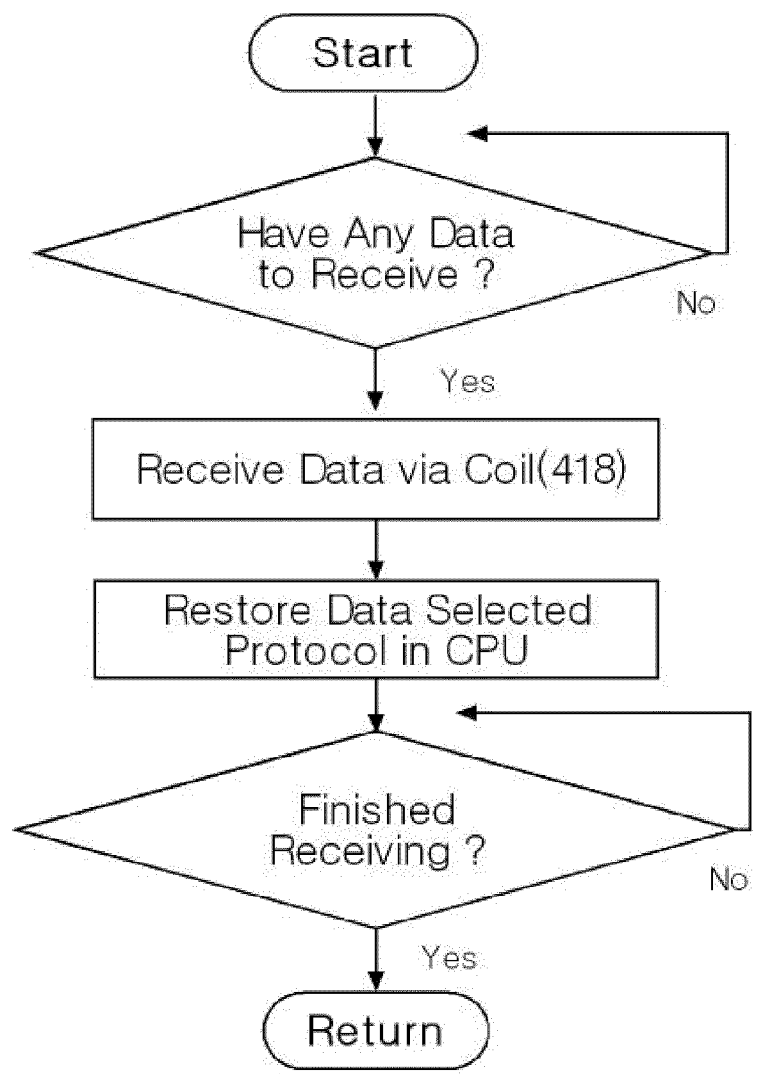
FIG. 8 is a flowchart illustrating according to an embodiment of the present invention.

The protocol of the received signal may be analyzed by a program (see FIG. 8) embedded in the receiver ROM 413 and the receiver RAM 414 of the receiver CPU 412a to restore the signal, and then the signal may be outputted as the original digital signal 422 (data, 1001) via an interface 421.

In FIGS. 1 to 3, the condenser 424 may be commonly used to perform reception by a typical PLC method. In this case, the PLC method may be appropriate for the high-speed data reception, but may be relatively weak for surrounding noise.

Assuming that the reception coil 418 includes the coil 417 wound one time with the power line, the coil 419 wound 2,500 times with the power line, and a resistor 5 connected in parallel thereto, when the data current is about 2.51 mA, the output voltage of the coil 419 may become 900 (mV)×2.51 (mA)÷(406×10³)≈0.00556 (mV)≈5.56 (μV) when the data sheet (part R5, burden Resistor 5, 406 A, 900 mV) of the current transformer (TS76V/L) of FIG. 10 is quoted. A relatively larger amount of noise may exist around the consumer home than that around the transformer. As the biggest difference from a typical PLC reception method, since the reception of the current of the data signal by the reception coil 418 can be considered as receiving power (work, energy), the most powerful noise of the power line such as halogen lamp inverter noise and surge voltage noise can be completely blocked.

The filter circuit 420a may be a part of an AC ammeter circuit. When the power line frequency is about 60 Hz and FSK-type transmission data frequency is about 400 kHz, a signal sensed at the coil 419 via the coil 417 may be two types, i.e., about 60 Hz and about 400 kHz. However, when 60 Hz is considered as noise and data is considered as a signal, the S/N of the signal current I may be (1×10)⁶÷60≈6666 while passing through the filter condenser (100 pF of 420a) by Equation (2) above. Accordingly, only 400 kHz data may be received.

In FIG. 6, the load at the side of the consumer home based on the transformer may be considered as a circuit in which about 1,000 coils, resistors, condensers, and varistors are connected in parallel and several hundreds of coils of a mechanical integrating wattmeter are connected in series. In consideration of these realistic details, assuming that the data amplifier 406 that outputs the sine wave of data (700 mV, 400 kHz) and the coil 407 are connected to each other, the distance from the transformer to the consumer home is about 200 meters on average, about 40 power distribution lines are connected, and a total of 200 homes are connected by 5 homes per line, the power consumption of the data amplifier 406 can be calculated as follows.

However, the current of the coil 407 and the condenser 425 may be calculated with a resistor current.

The coil effect of the power line may be ignored, and the electrostatic capacity of line may use the data of FIG. 11. It will be assumed that the number of the varistors and condensers that are connected in parallel to home appliances of a consumer home is about 1,000 and the capacity of each condenser is about 10 pF.

(1) Current of resistor 100 connected in parallel to coil 407 is 0.7(V)÷100(Ω)=7 (mA).

(2) Inductance (10 μH) current of coil 407 is about 27.9 mA.

(3) Current of line resistance 1.209( ) is 0.1(V)÷1.209 (Ω)≈0.083 (A)≈83 (mA).

(4) When condenser 425 is 0.01 μF, current of 200 homes is 200×2.51 (mA)≈502 (mA).

(5) When the number of condensers or varistors of 200 homes is 1,000 and the capacity of each condenser is 10 pF, flowing current is about 2.51 mA.

(6) Line electrostatic capacity is 40 (ea)×200 (m)=8000 (m)=8 km, 8 (km)×0.18 (μF)=1.44 (μF), and data current flowing by line electrostatic capacity is about 361.44 mA.

(7) Output voltage of coil 419 is about 5.56 μV, and current flowing in resistor (5Ω) is included in current of condenser 425.

The sum of currents flowing from the data amplifier 406 to the coil 407 may become (7+27.9)+(83+502+2.51+361.44)÷7≈170.464 (mA) based on the above items (1) to (7).

The power consumption may be 0.7(V)×0.170464 (A)≈0.119 (watt).

From the above details, the transmission output may be calculated to be less than about 0.2 watt. In power line enforcement ordinances and enforcement regulations of power line (radio wave) communication related laws of countries including Korea, United States, and Japan, based on the fact that the transmission output is regulated in a maximum of about 10 watt, the present invention is absolutely advantageous in that the power line communication line can be constructed with about a fiftieth part or less. Since excluding the power factor concept from the coil and the condenser significantly differs from a method of calculating the output of a wireless transmitter, new criteria are needed.

DP communication may be similar to the interphone line speed. The grounds of this judgment are based on an assumption that all power supplies are removed and the power line itself is a wire line.

Regarding RS485/42 transmission, the interphone line may usually record a stable speed of about 9,600/bps within a distance of about 3 km. Accordingly, a speed of about 96 k/bps may be expected within about 300 meters. However, the line resistance and line-to-line stray capacitance (condenser effect) are relatively smaller in the power line than the interphone line, and in consideration of the rise of the data frequency f, it is expected that there will be a speed improvement of about 1,050 times. The effective transmission distance may be maximum when the transmission data frequency is distorted by the line stray capacitance and the reception marginal gain is zero by a radiation power loss, but this needs to be further studied through tests and proofs.

In FIG. 6, a typical mechanical integrating wattmeter WH may have a relative reactance according to the transmission data frequency. This may act as a resistant factor for the data transmission. However, since electric energy is calculated in an electronic watt-hour meter while the power line penetrates an ampere meter (CT), the electronic watt-hour meter may be advantageous for the data transmission because there is no reactance factor.

There is a controversy about whether DP communication is defined as a wire communication or a wireless communication. It is difficult to determine in that DP communication can transmit an audio frequency range and a high frequency range. DP communication can be defined as wireless communication in that a high frequency signal is aerial-radiated, but that judgment may be deferred in that looping of a signal source in a line is similar to the interphone and coaxial cable transmission method.

In downtown, when the transmission data frequency f is equal to or less than about 400 kHz, the reason why transmission/reception is possible up to a consumer power line between the transformer and the consumer home regardless of underground or aboveground coincides with exclusion of a worry that a voltage boosted in the transformer will not be transmitted due to matching of the signal source itself and the power line.

EXAMPLE 1

In FIG. 4, two-way communication is implemented as a cross communication by installing a pair of transmission/reception, i.e., a transmitter at the side of a transformer and a receiver at the side of a consumer home. A data output signal of the CPU 412 and the receiver interface 421 may be connected with a WiFi module 415, and a WiFi router 416 may be installed at a general power outlet for household to construct a WiFi network (see FIG. 12) at a place where a power line exists.

EXAMPLE 2

Figure 12:
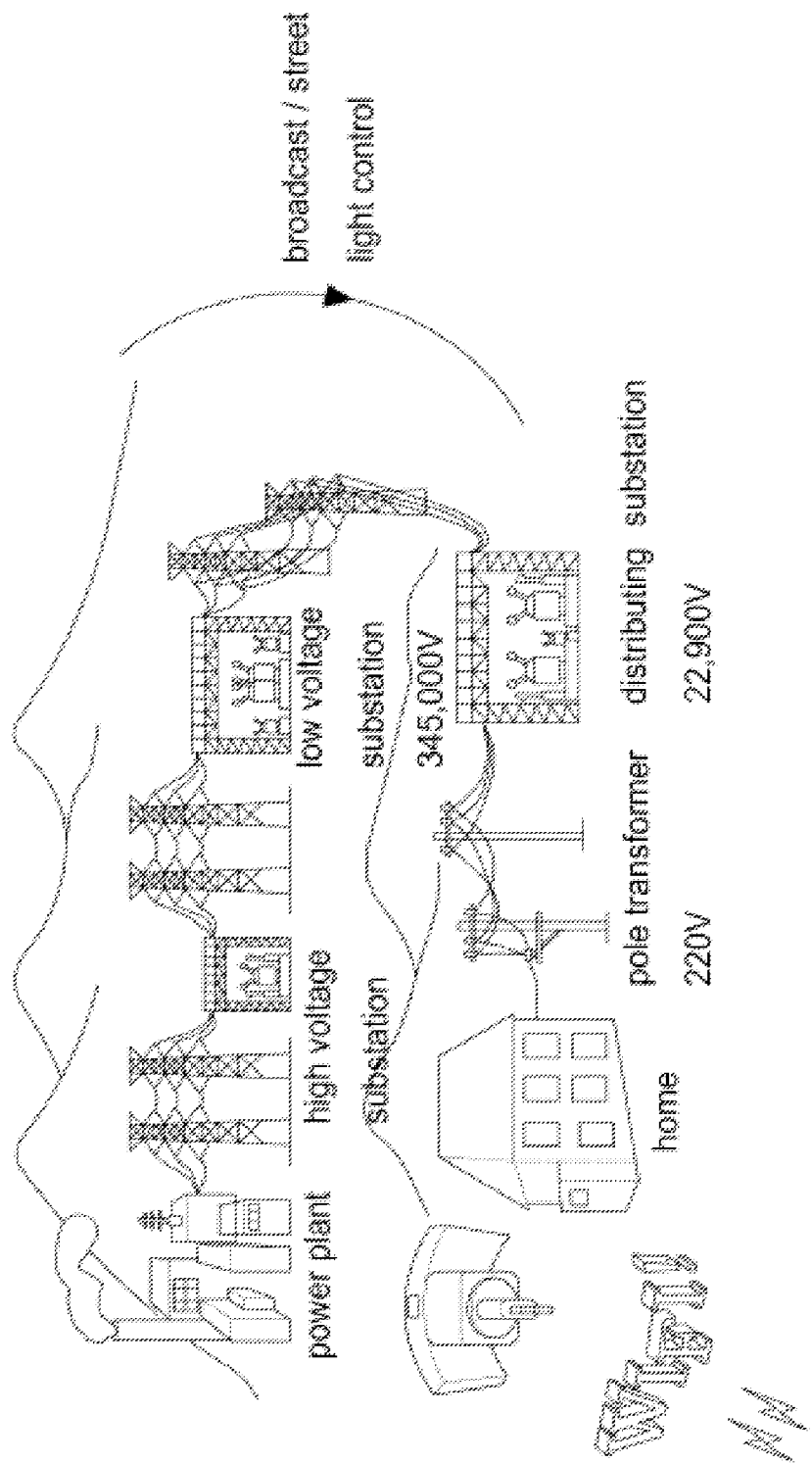
FIG. 12 is a view illustrating WIFI network implemented with the present invention.
Figure 13:
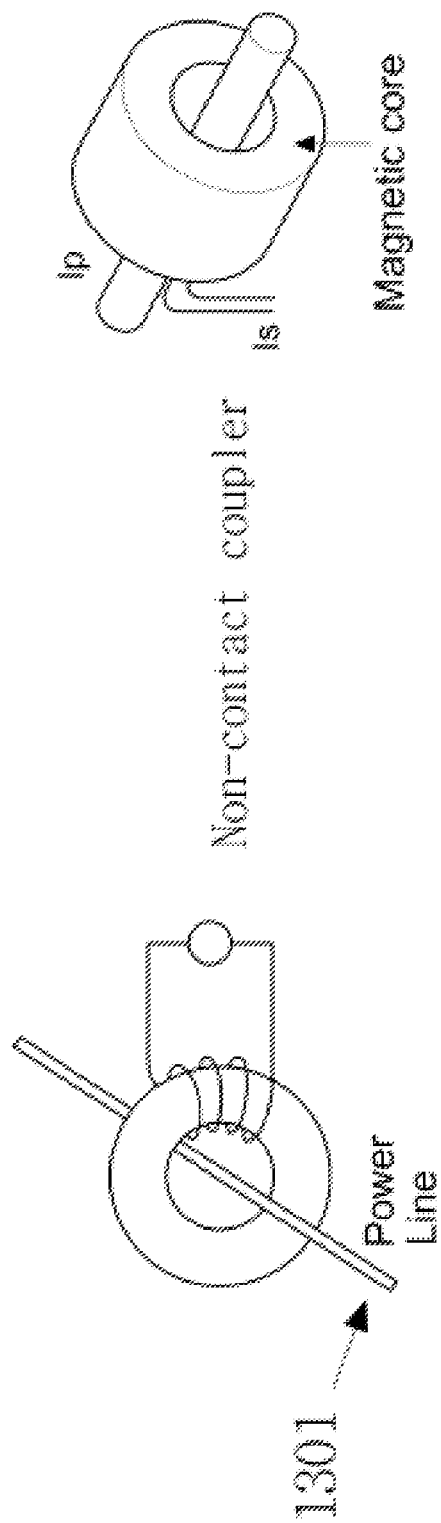
FIG. 13 is a view illustrating conventional inductive coupler.

As a commercialized example of FIG. 2, one-way communication network can be implemented from a high voltage part to a consumer home without a repeater between a transformer and a consumer home as shown in FIG. 12, which can be applied to remote control (streetlight control), broadcasting network, and traffic signal control.

A DP method according to an embodiment of the present invention has the following differences from a typical PLC method.

(1) The DP method can transmit and receive an audible frequency band (20 Hz to 20 kHz). This means that communication is possible at any place where a power line exists and there is no limitation in transmission distance. As a consumer load is larger, a data current flowing in a power line increases, allowing data transmission to be effective. In a typical PLC method, as shown in FIG. 6, about 1,000 coils, resistors, and condensers are connected in parallel. Accordingly, the data output increase, the consumer load that is consumed may further increase, as if an accelerator is stepped with a hand brake pulled.

(2) The DP method completely deals with noise of adjacent power lines. Since a reception coil filter 420a receives only a data effective current, floating voltage noise can be completely blocked.

(3) The DP method can obtain a commercializable output with about 0.2 Watt output or less. Compared to the PLC method, the DP method can be commercialized with power consumption of a fiftieth part or less.

(4) In the DP method, since the data current mostly flows into the condenser, the degree of effect on electronics of consumer is significantly small compared to the PLC method.

(5) In the DP method, since there is no physical contact with the power lines (copper and aluminum), a dielectric breakdown due to a surge voltage does not occur.

(6) The DP method performs transmission through impedance matching between power line and data, whereas the PLC method is merely an extension of an antenna through non-matching transmission.

Expected effects when the present invention is commercialized are as follows.

Since the Internet infrastructure of power line communication which can be called capillary vessels of communication is established by converting the ongoing research direction of typical PLC into DP research, about 1.5 billion worldwide industrial and household electricity and gas meters enter the Internet infrastructure region. Also, coaxial cables, cable modems, routers, power adapters, and LAN cables can be replaced with only one WiFi router 416, minimizing the power consumption at ordinary times and thus achieving an effect of economical DCT reading (Technology No. 15394 http://www.patentmart.or.kr) and the ultimate purpose of Smart Grid. In addition, the communication infrastructure shadow area of the advanced countries, existing cables and telephone wires can disappear, inducing the beautifying of the environment, the reduction of communication cost and accelerating the construction of infrastructure. Furthermore, the business of controlling streetlights and home appliances such as air conditioners, boilers, and washing machines through Internet (e.g., smartphone) can be activated, expecting a new revolution of energy saving and home appliances in terms of microeconomics.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of transmitting and receiving data using a Data Plus (DP) formula in a power line, comprising:
   (1) transmitting data to be transmitted to a CPU via an interface and converting the data into data of a protocol selected using a program stored in a ROM and a RAM to transmit the data to a mixer;
   (2) detecting a voltage phase from a power supply to transmit a data transmission time signal according to a phase change and a phase inversion time signal of a transmission data voltage to the mixer via a Schmitt-Trigger circuit;
   (3) transmitting, by the mixer, the signals transmitted from the steps (1) and (2) to an amplifier according to a transmission time to allow the amplifier to amplify and then transmit the signals to a coil, and transmitting, by a data plus transformer (DPT), the transmitted signals to coils of a power line coil wound n times as an induced current; and (4) allowing a current of the data signals transmitted from the step (3) to flow in condensers of a condenser to receive by coils of a power line coil and then amplifying the current in a filter and amplification interface, transmitting the current to a receiver CPU, restoring a program stored in a receiver ROM and a receiver RAM to an original data signal, and receiving the data signal via an interface or receiving through a condenser of a condenser.

* * * * *